(12) United States Patent
Abad et al.

(10) Patent No.: US 7,112,645 B2
(45) Date of Patent: Sep. 26, 2006

(54) POLYCARBONATE COMPOSITION AND METHOD OF MAKING THEREOF

(75) Inventors: Carlos Abad, Impington Cambridge (GB); Jose Maria Alonso Franco, Murcia (ES); Hiromi Ishida, Moka (JP); Miguel Angel Salomon, Murcia (ES); Tomoaki Shimoda, Ichihara (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/804,714

(22) Filed: Mar. 19, 2004

(65) Prior Publication Data

US 2005/0209434 A1    Sep. 22, 2005

(51) Int. Cl.
    *C08G 64/00*    (2006.01)
(52) U.S. Cl. .................. 528/196; 264/176.1; 264/219; 422/131
(58) Field of Classification Search ............. 264/176.1, 264/219; 422/131, 135; 528/196
    See application file for complete search history.

(56) References Cited

U.S. PATENT DOCUMENTS

| 3,442,854 | A |   | 5/1969  | Curtius et al.    |         |
|-----------|---|---|---------|-------------------|---------|
| 5,026,817 | A |   | 6/1991  | Sakashita et al.  |         |
| 5,097,002 | A |   | 3/1992  | Sakashita et al.  |         |
| 5,142,018 | A |   | 8/1992  | Sakashita et al.  |         |
| 5,151,491 | A |   | 9/1992  | Sakashita et al.  |         |
| 5,340,905 | A |   | 8/1994  | Kühling et al.    |         |
| 5,525,701 | A |   | 6/1996  | Tominari et al.   |         |
| 5,777,064 | A |   | 7/1998  | Hayashi et al.    |         |
| 5,907,027 | A |   | 5/1999  | Spilman et al.    |         |
| 6,177,536 | B1 |  | 1/2001  | Anamizu et al.    |         |
| 6,271,290 | B1 | * | 8/2001  | Inoue et al.      | 524/145 |
| 6,277,946 | B1 |  | 8/2001  | van Heijkant et al. |       |
| 6,303,735 | B1 | * | 10/2001 | Shimoda et al.    | 528/196 |
| 6,339,138 | B1 |  | 1/2002  | van Hout et al.   |         |
| 6,410,678 | B1 |  | 6/2002  | Ishida et al.     |         |
| 6,486,294 | B1 | * | 11/2002 | Brack et al.      | 528/198 |
| 6,509,435 | B1 | * | 1/2003  | Kageyama et al.   | 528/196 |
| 6,608,165 | B1 | * | 8/2003  | Funakoshi et al.  | 528/196 |
| 2003/0032760 | A1 | | 2/2003 | Inoue et al.      |         |

OTHER PUBLICATIONS

International Search Report. Mailed Jun. 13, 2005 for International Application No. PCT/US2005/008822.

* cited by examiner

*Primary Examiner*—Terressa Boykin

(57) ABSTRACT

A polycarbonate composition comprises chloride, sulfate, phosphate or a combination of two or more of the foregoing ionic species in an amount of zero to about 100 parts per billion based on the total weight of the composition; and phenol, carbonic diester, aromatic dihydroxy compound or combination of two or more of the foregoing organic compounds in an amount of zero to about 500 parts per million by weight based on the total weight of the composition; wherein the polycarbonate has a weight average molecular weight of about 40,000 to about 90,000 dalton as determined by gel permeation chromatography using polystyrene standards and a melt volume rate of about 1 to about 35 cm$^3$/10 minutes when measured at about 300° C. with a force of about 1.2 kilograms.

26 Claims, No Drawings

POLYCARBONATE COMPOSITION AND METHOD OF MAKING THEREOF

BACKGROUND OF THE INVENTION

This disclosure relates to polycarbonate and methods of making polycarbonate, particularly polycarbonate having a low level of ionic species and residual monomers.

Polycarbonate, a thermoplastic that has excellent impact resistance and other mechanical properties, as well as heat resistance and transparency, is widely used in many engineering applications, including mechanical parts, optical disks, and automotive parts.

Polycarbonates may be produced by an interfacial method employing phosgene, a melt process employing phosgene and a melt process that does not employ phosgene. Regardless of the synthetic method it is desirable for the polycarbonate to have a low level of ionic species (cations and anions), unreacted monomers and small molecule side products. Ionic species can affect the quality of the polycarbonate, particularly with regard to color, molecular weight, rheological and/or electrical properties. Unreacted monomers and small molecule side products can result in outgassing and the dirtying of injector molds and extruder dies. Outgassing is particularly undesirable in electronic devices and components where the released gas can have a negative impact on surrounding components and materials. In addition unreacted monomers and small molecule side products can be detrimental to the taste and other organoleptic properties of food and beverages residing in containers made of polycarbonate.

Therefore, a need exists for method of preparing a polycarbonate that has low levels of ionic species, unreacted monomers and small molecule side products.

BRIEF DESCRIPTION OF THE INVENTION

The above mentioned need is met by a polycarbonate composition comprising chloride, sulfate, phosphate or a combination of two or more of the foregoing ionic species in an amount of zero to about 100 parts per billion by weight (ppb) based on the total weight of the polycarbonate; and phenol, carbonic acid diester, aromatic dihydroxy compound or combination of two or more of the foregoing organic compounds in an amount of zero to about 500 parts per million by weight (ppm) based on the total weight of the polycarbonate, wherein the polycarbonate has a weight average molecular weight of about 40,000 to about 90,000 dalton as determined by gel permeation chromatography using polystyrene standards and a melt volume rate of about 1 to about 35 cubic centimeter ($cm^3$)/10 minutes when measured at about 300° C. with a force of about 1.2 kilograms (kg).

The process for preparing the above described polycarbonate comprises: mixing a carbonic acid diester and an aromatic dihydroxy compound in the presence of one or more catalysts at a temperature of about 80° C. to 200° C. at atmospheric pressure to form a mixture. The mixture is reacted at a first reaction temperature of about 210° C. to about 290° C. and a first reaction pressure of about 10 to about 200 millimeters of mercury (mm Hg) to form an oligomer containing mixture; followed by reacting the oligomer containing mixture at a second reaction temperature of about 270° C. to about 315° C. and a second reaction pressure of about 0.075 to about 7.5 mm Hg to form a polycarbonate containing mixture; adding catalyst quenching agent to the polycarbonate containing mixture and devolatizing the polycarbonate containing mixture under vacuum conditions wherein the resulting polycarbonate has chloride, sulfate, phosphate or a combination of two or more of the foregoing ionic species in an amount of zero to about 100 ppb based on the total weight of the polycarbonate; phenol, carbonic acid diester, aromatic dihydroxy compound or combination of two or more of the foregoing organic compounds in an amount of zero to about 500 ppm based on the total weight of the polycarbonate; and further wherein the polycarbonate has a weight average molecular weight of about 40,000 to about 90,000 dalton as determined by gel permeation chromatography using polystyrene standards and a melt volume rate of about 1 to about 35 $cm^3$/10 minutes when measured at about 300° C. with a force of about 1.2 kg.

The above described and other features are exemplified by the following figures and detailed description.

DETAILED DESCRIPTION OF THE INVENTION

In one embodiment, a polycarbonate composition comprises chloride, sulfate, phosphate or a combination of two or more of the foregoing ionic species in an amount of zero to about 100 ppb based on the total weight of the polycarbonate; and phenol, carbonic acid diester, aromatic dihydroxy compound or combination of two or more of the foregoing organic compounds in an amount of zero to about 500 ppm based on the total weight of the polycarbonate; wherein the polycarbonate has a weight average molecular weight of about 40,000 to about 90,000 dalton as determined by gel permeation chromatography using polystyrene standards and a melt volume rate of about 1 to about 35 $cm^3$/10 minutes when measured at about 300° C. with a force of about 1.2 kg. The polycarbonate composition may have a Fries compound concentration of zero to about 5,000 ppm and a hydroxy content of about 50 ppm to about 10,000 ppm, both based on the total weight of the polycarbonate. The composition exhibits a low level of outgassing making it suitable for a range of electronic applications as well as food and beverage containers.

The polycarbonate composition preferably comprises chloride, sulfate, phosphate or a combination of two or more of the foregoing ionic species in an amount of zero to about 50 ppb, more preferably zero to about 10 ppb and most preferably zero to about 5 ppb, based on the total weight of the polycarbonate.

The polycarbonate composition preferably comprises phenol, carbonic diester, dihydroxy aromatic compound or a combination of two or more of the foregoing organic compounds in an amount of zero to about 350 ppm, more preferably zero to about 250 ppm and most preferably zero to about 150 ppm.

The above described polycarbonate composition may be made by mixing a carbonic acid diester and an aromatic dihydroxy compound in the presence of one or more catalysts at a temperature of about 80° C. to about 200° C. and atmospheric pressure to form a mixture. The mixture is reacted at a first temperature of about 210° C. to about 290° C. and a first pressure of about 10 to about 200 mm Hg to form an oligomer containing mixture. The oligomer containing mixture is reacted at a second temperature of about 270° C. to about 315° C. and a second pressure of about 0.075 to about 75 mm Hg to form a polycarbonate containing mixture. A catalyst quenching agent is added to the polycarbonate containing mixture and the polycarbonate containing mixture is devolatized.

Generally, aromatic polycarbonates possess recurring structural units of the formula (I):

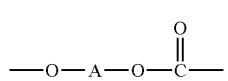

wherein A is a divalent aromatic radical of the dihydroxy compound employed in the polymer reaction. Polycarbonate prepared by melt polymerization frequently contains Fries product. A Fries product is a product of a Fries reaction. The terms "Fries reaction" and "Fries rearrangement" are used interchangeably herein, and refer to the amount of side chain branching measured as branching points. The Fries rearrangement is an undesirable side reaction that occurs during the preparation of polycarbonate using the melt process. The resultant Fries product serves as a site for branching of the polycarbonate chains, which affects flow and other properties of the polycarbonate. Although low levels of Fries products may be tolerated in polycarbonates, the presence of high levels may negatively affect performance characteristics of the polycarbonate such as toughness and moldability. The amount of Fries product may be determined by measuring the branching points via methanolysis followed by high pressure liquid chromatography (HPLC).

The reactants utilized in the production of a polycarbonate by a polycondensation reaction are generally a dihydroxy compound and a carbonic acid diester. There is no particular restriction on the type of dihydroxy compound that may be employed. Dihydroxy compounds include bisphenol compounds represented by the general formula (II) below may be used

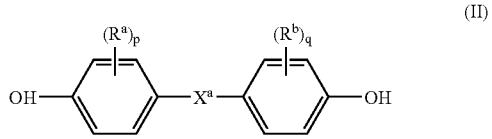

wherein $R^a$ and $R^b$ may be the same or different and wherein each represents a halogen atom or monovalent hydrocarbon group, and p and q are each independently integers from 0 to 4. Preferably, X represents one of the groups of formula (III):

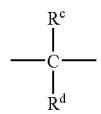

or

wherein $R^c$ and $R^d$ each independently represent a hydrogen atom or a monovalent linear or cyclic hydrocarbon group and $R^e$ is a divalent hydrocarbon group. Examples of the types of bisphenol compounds that may be represented by formula (II) include the bis(hydroxyaryl)alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl) phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and the like; bis (hydroxyaryl)cycloalkane series such as, 1,1-bis(4-hydroxyphenyl)cyclopentane, 1,1-bis(4-hydroxyphenyl) cyclohexane, and the like; and the like, as well as combinations comprising at least one of the foregoing bisphenol compounds.

Other bisphenol compounds that may be represented by formula (II) include those wherein X is —O—, —S—, —SO— or —SO₂—. Examples of such bisphenol compounds are bis(hydroxyaryl)ethers such as 4,4'-dihydroxy diphenyl ether, and the like; 4,4'-dihydroxy-3,3'-dimethylphenyl ether; bis(hydroxy diaryl)sulfides, such as 4,4'-dihydroxy diphenyl sulfide, 4,4'-dihydroxy-3,3'-dimethyl diphenyl sulfide, and the like; bis(hydroxy diaryl) sulfoxides, such as 4,4'-dihydroxy diphenyl sulfoxides, 4,4'-dihydroxy-3,3'-dimethyl diphenyl sulfoxides, and the like; bis (hydroxy diaryl)sulfones, such as, 4,4'-dihydroxy diphenyl sulfone, 4,4'-dihydroxy-3,3'-dimethyl diphenyl sulfone; and the like, as well as combinations comprising at least one of the foregoing bisphenol compounds.

Other bisphenol compounds that may be utilized in the polycondensation of polycarbonate are represented by the formula (IV).

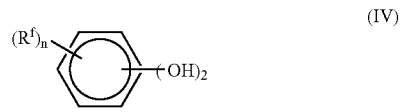

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (IV), are resorcinol, substituted resorcinol compounds (such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, and the like), catechol, hydroquinone, substituted hydroquinones, (such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, and the like), and the like, as well as combinations comprising at least one of the foregoing bisphenol compounds.

Bisphenol compounds such as 3,3,3',3'-tetramethyl-1,1'-spirobi[indane]-6,6'-diol represented by the following formula (V) may also be used.

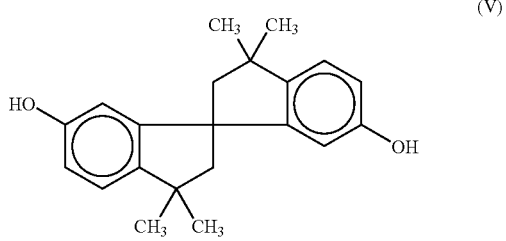

The preferred bisphenol compound is bisphenol A. In addition, copolymeric polycarbonates may be manufactured by reacting at least two or more bisphenol compounds with the carbonic acid diester.

Examples of the carbonic acid diester that may be utilized to produce the polycarbonates are diphenyl carbonate, bis(methyl salicyl) carbonate, bis(2,4-dichlorophenyl)carbonate, bis(2,4,6-trichlorophenyl)carbonate, bis(2-cyanophenyl)carbonate, bis(o-nitrophenyl)carbonate, ditolyl carbonate, m-cresyl carbonate, dinaphthyl carbonate, bis(diphenyl)carbonate, diethyl carbonate, dimethyl carbonate, dibutyl carbonate, dicyclohexyl carbonate, and the like, as well as combinations comprising at least one of the foregoing carbonic acid diesters. The preferred carbonic acid diester is diphenyl carbonate.

The carbonic acid diester may contain a dicarboxylic acid and/or dicarboxylate ester. In general, it is desirable for the carbonic acid diester to contain an amount of less than or equal to about 50 mole percent (mole %), preferably less than or equal to about 30 mole % of either dicarboxylic acid or dicarboxylate ester. Examples of dicarboxylic acids or dicarboxylate esters that may be utilized are terephthalic acid, isophthalic acid, sebacic acid, decanedioic acid, dodecanedioic acid, diphenyl sebacic acid, diphenyl terephthalic acid, diphenyl isophthalic acid, diphenyl decanedioic acid, diphenyl dodecanedioic acid, and the like, as well as combinations comprising at least one of the foregoing. The carbonic acid diester may contain at least two kinds of dicarboxylic acids and/or dicarboxylate esters if desired.

An additional example of a suitable dicarboxylic acid or ester is an alicyclic dicarboxylic acid or ester. As used herein the terms "alicyclic" and "cycloaliphatic radical" have the same meaning and refer to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

Non-limiting examples of alicyclic dicarboxylic acids or esters comprise an acid or ester chosen from: cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, diphenyl 1,4-cyclohexanedicarboxylate, and a combination of at least two different alicyclic dicarboxylic acids or esters.

It is generally desirable for the molar ratio of the carbonic acid diester to the aromatic dihydroxy compound to be about 0.95 to about 1.20. Within this range it is generally desirable to have the molar ratio greater than or equal to about 1.01. Also desirable within this range is a molar ratio of less than or equal to about 1.10.

If desired, copolymer polycarbonates may be prepared by reacting a polyfunctional compound having at least three functional groups with the aromatic dihydroxy compound and carbonic acid diester. Suitable polyfunctional compounds include those having a phenolic hydroxy group or a carboxyl group. The preferred polyfunctional compound is a phenolic compound having three hydroxy groups. Examples of such polyfunctional compounds are 1,1,1-tris(4-hydroxyphenyl)ethane, 2,2',2"-tris(4-hydroxyphenyl)diisopropyl benzene, alpha-methyl-alpha,alpha',alpha"-tris(4-hydroxyphenyl)-1,4-diethyl benzene, alpha,alpha',alpha"-tris(4-hydroxyphenyl)-1,3,5-triisopropyl benzene, phloroglycine, 4,6-dimethyl-2,4,6-tri(4-hydroxyphenyl)-heptane-2, 1,3,5-tri(4-hydroxyphenyl)benzene, 2,2-bis-[4,4-(4,4'-dihydroxyphenyl)-cyclohexyl]-propane, trimellitic acid, 1,3,5-benzene tricarboxylic acid, pyromellitic acid, and the like, as well as combinations comprising at least one of the foregoing polyfunctional compounds. The preferred polyfunctional compounds are 1,1,1-tris(4-hydroxyphenyl)ethane and alpha,alpha',alpha"-tris(4-hydroxyphenyl)-1,3,5-triisopropyl benzene, or combinations comprising at least one of the foregoing compounds.

Polyfunctional compounds may generally be used in amounts less than or equal to about 0.03 moles per mole of aromatic dihydroxy compound. Within this range, it is desirable to use the polyfunctional compounds in amounts greater than or equal to about 0.001 moles per mole of aromatic dihydroxy compound. Also desirable within this range, is an amount of polyfunctional compound less than or equal to about 0.02 moles, preferably less than or equal to about 0.01 mole per mole of aromatic dihydroxy compound.

We have discovered that aromatic polycarbonates prepared according to the disclosed method have low residual organic compounds, metals and ions. As used herein metal refers to both neutral and cationic forms of metals such as chromium, titanium, nickel, iron and manganese. The term ions as used herein refers to anions such as chloride, sulfate and phosphate. It was discovered that the level of metals and ions found in a polycarbonate made by the method disclosed herein is low and depends, at least in part, on the quality of the initial carbonic diester and aromatic dihydroxy compound, the amount of added alkali or alkali earth metal compound used as catalyst of the polymerization, and/or the amount of the catalyst quenching agent used. Based on this discovery, the aromatic dihydroxy compound may comprise up to about 100 ppb, and preferably up to about 50 ppb based on the total weight of the aromatic dihydroxy compound of metals as well as up to about 200 ppb, and preferably up to about 50 ppb based on the total weight of the aromatic dihydroxy compound of ions. The carbonic acid diester may comprise up to about 200 ppb, and preferably up to about 50 ppb based on the total weight of the carbonic acid diester of metals and up to about 200 ppb and preferably up to about 50 ppb based on the total weight of the carbonic acid diester of ions. Quantitative analysis of metals, metals in the carbonic acid diester and aromatic dihydroxy compound may be carried out by conventional Inductively Coupled Plasma Emission Spectroscopy (ICP) methods to determine the presence of each constituent to the "parts per billion"

(ppb) level. For quantitative analysis of ions, the sample is submerged in de-ionized water kept at 55° C. for 24 hours, the anions released into the water are then analyzed via ion chromatography with a Dionex DX500 Ion Chromatograph.

An alkali metal compound or an alkaline earth metal compound may be utilized as a catalyst for the melt polycondensation reaction. The carbonic acid diester is reacted with an aromatic dihydroxy compound in the presence of a catalytically effective amount of at least one melt polycondensation catalyst. The process further may include adding an amount of one or more catalyst quenching agents, together or separately, to the polycarbonate oligomer at a time during one or more stages of the polycondensation process, wherein the amount and the time of addition of the agent are sufficient to decrease the concentration of un-reacted organic molecules in the polycarbonate composition produced relative to a composition produced from the polycarbonate oligomer without addition of the agent in the amount and at the time.

Organic salts, inorganic salts, oxides, hydroxides, hydrides and alcoholates of alkali metal and/or alkaline earth metal compounds may be utilized to catalyze the polycondensation reaction. Examples of alkali metal catalysts, sometimes referred to as "alpha catalysts," include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium boron phenyl, sodium benzoate, potassium benzoate, lithium benzoate, disodium hydrogenphosphate, dipotassium hydrogenphosphate, dilithium hydrogenphosphate, lithium dihydrogenphosphate ($LiH_2PO_3$), sodium dihydrogenphosphate ($NaH_2PO_3$), potassium dihydrogenphosphate ($KH_2PO_3$), rubidium dihydrogenphosphate ($RbH_2PO_3$), cesium dihydrogenphosphate ($CsH_2PO_3$), lithium phosphite ($Li_2HPO_3$), sodium phosphite ($Na_2HPO_3$), potassium phosphite ($K_2HPO_3$), rubidium phosphite ($Rb_2HPO_3$), cesium phosphite ($Cs_2HPO_3$), lithium phosphite ($Li_3PO_3$), sodium phosphite ($Na_3PO_3$), potassium phosphite ($K_3PO_3$), rubidium phosphite ($Rb_3PO_3$), cesium phosphite ($Cs_3PO_3$), disodium salt, dipotassium salt and dilithium salt of bisphenol A, sodium salt, potassium salt, lithium salt of bisphenol A, and the like, as well as combinations comprising at least one of the forego-ing alkali earth metal catalysts.

Examples of alkaline earth metal catalysts include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, and the like, as well as combinations comprising at least one of the foregoing alkaline earth metal catalysts.

It may also be desirable to use the alkali metal or alkaline earth metal catalyst in conjunction with one or more basic compounds, sometimes referred to as "beta catalysts," or with an acid (such as boric acid) as catalysts in the polycondensation reaction. Preferred basic compounds that may be used as catalysts are those which contain nitrogen or phosphorus and which decompose at high temperatures. Non-limiting examples of basic compounds that may be used as catalysts are ammonium hydroxides having alkyl, aryl, araryl, and/or alkaryl groups such as tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide ($\Phi\text{-}CH_2(Me)_3NOH$), and the like; phosphonium hydroxides having alkyl, aryl or aralkyl groups such as tetramethylphosphonium hydroxide ($Me_4POH$), tetraethylphosphonium hydroxide ($Et_4POH$), tetrabutylphosphonium hydroxide ($Bu_4POH$), trimethylbenzyl phosphonium hydroxide ($\Phi\text{-}CH_2(Me)_3POH$), and the like; tertiary amines, such as trimethyl amine, triethyl amine, dimethylbenzyl amine, triphenyl amine, and the like; secondary amines represented by $R_2NH$, wherein R may be alkyl, (e.g., methyl, ethyl, and the like) or aryl (e.g., phenyl, toluyl, and the like); primary amines represented by $RNH_2$, wherein, R may be alkyl, (e.g., methyl, ethyl, and the like) or aryl (e.g., phenyl, toluyl and the like); pyridines, such as 4-dimethylamino pyridine, 4-diethylamino pyridine, 4-pyrolidinopyridine, and the like; imidazole, such as 2-methyl imidazole, 2-phenyl imidazole, and the like; and the like, as well as combinations comprising at least one of the foregoing basic compounds.

Other basic compounds that may be used in addition or alternatively as catalysts are ammonia, tetramethyl ammonium borohydride ($Me_4NBH_4$), tetrabutyl borohydride ($Bu_4NBH_4$), tetramethyl ammonium tetraphenyl borate ($Me_4NBPh_4$), tetrabutyl ammonium tetraphenyl borate ($Bu_4NBPh_4$), tetramethyl ammonium acetate, tetrabutyl ammonium acetate, tetramethyl ammonium phosphate, tetrabutyl ammonium phosphate, tetramethyl ammonium phosphite, tetrabutyl ammonium phosphite, tetramethyl phosphonium borohydride ($Me_4PBH_4$), tetrabutyl ammonium phosphonium borohydride ($Bu_4PBH_4$), tetramethyl phosphonium tetraphenyl borate ($Me_4PBPh_4$), tetrabutyl phosphonium tetraphenyl borate ($Bu_4NBPh_4$), tetramethyl phosphonium acetate, tetrabutyl phosphonium acetate, tetramethyl phosphonium phosphate, tetrabutyl phosphonium phosphate, tetramethyl phosphonium phosphite, tetrabutyl phosphonium phosphite, and the like, as well as combinations comprising at least one of the foregoing basic compounds. Preferred basic compounds are tetraalkyl ammonium hydroxide and its salts, and tetraalkyl phosphonium hydroxide and its salts.

The basic compound may be used in an amount of about $1 \times 10^{-6}$ to about $1 \times 10^{-1}$ moles per mole of aromatic dihydroxy compound. Within this range it is preferable to use an amount greater than or equal to about $1 \times 10^{-5}$ moles per mole of aromatic dihydroxy compound. It is also preferable within this range to use an amount less than or equal to about $1 \times 10^{-2}$ moles per mole of aromatic dihydroxy compound.

The melt polycondensation catalyst may be added in a catalytically effective amount. "Catalytically effective amount" refers to the amount of the catalyst at which the desired catalytic performance is exhibited.

When more than one catalyst is employed, each catalyst may be incorporated into the melt at the same or different stage of the reaction. The addition of the alkali metal or alkaline earth metal catalyst can be done at different points during the process, between or in the multistage reactors. The amount of alkali metal or alkaline earth metal catalyst used is typically about $10^{-8}$ mole to about $2 \times 10^{-6}$ mole per one mole of the aromatic dihydroxy compound; preferably about $10^{-7}$ mole to about $10^{-6}$ mole per one mole of the aromatic dihydroxy compound.

During the manufacture of polycarbonates, a chain termination agent may also be used. The chain termination agent used may be an aryloxy compound capable of intro ducing terminal groups, represented by the general formula (VI) below, to the end of the polycarbonate molecules.

$$ArO— \quad (VI)$$

wherein Ar represents an aromatic hydrocarbon group containing 6 to 50 carbon atoms. There is no specific restriction on the type of aromatic hydrocarbon group, which may be a condensed ring structure such as a phenyl group, naphthyl group, anthranyl group, or the like. In addition, one of these aromatic rings may form a ring saturated with a hydrocarbon atom(s); and a hetero atom and/or different atoms may form cyclic structures. In addition, these aromatic rings may be substituted with a halogen or alkyl group containing 1 to 9 carbon atoms. Examples of aryloxy compounds are phenol, diphenyl carbonate, p-tert-butylphenol, p-tert-butylphenylphenyl carbonate, p-tert-butylphenyl carbonate, p-cumylphenol, p-cumylphenylphenyl carbonate, and the like; chroman compounds such as, 2,2,4-trimethyl-4-(4-hydroxyphenyl)chroman, 2,2,4,6-tetramethyl-4-(3,5-dimethyl-4-hydroxyphenyl)chroman, 2,2,3-trimethyl-3-(4-hydroxyphenyl)chroman, 2,2,3,6-tetramethyl-3-(3,5-dimethyl-4-hydroxyphenyl)chroman, 2,4,4-trimethyl-2-(2-hydroxyphenyl)chroman, and 2,4,4,6-tetramethyl-2-(3,5-dimethyl-2-hydroxyphenyl)chroman, and the like; as well as combinations comprising at least one of the foregoing aryloxy compounds.

These aryloxy compounds may be present in amounts of about 0.01 moles to about 0.2 moles per mole of the aromatic dihydroxy compound. Within this range it is generally desirable to have the aryloxy compounds in an amount of greater than or equal to about 0.02 moles per mole of the aromatic dihydroxy compound. Also desirable within this range is an amount less than or equal to about 0.15 moles, and preferably an amount less than or equal to about 0.1 moles per mole of the aromatic dihydroxy compound.

If the aryloxy compound is used within the above specified amounts as an end capping agent, then the molecular terminals of the polycarbonate that are obtained will be terminated with chain terminating agents expressed by the above-mentioned formula (VI) in an amount of about 1 to about 95%. Within this range, it is desirable to have an amount greater than or equal to about 10%, preferably greater than or equal to about 20% of the molecular terminals of the polycarbonate terminated with the chain terminating agents. It is also desirable, within this range, to have an amount less than or equal to about 90% of the molecular terminals of the polycarbonate terminated with the chain terminating agents. A polycarbonate having terminal groups represented by the formula (VI) in the amounts specified by the above-mentioned ranges generally has excellent heat resistance, and also demonstrates excellent mechanical properties such as high impact resistance, even at low molecular weights.

Alternatively or in addition to the above-mentioned aryloxy compounds, one or more aliphatic monocarboxy compounds capable of introducing one or more aliphatic hydrocarbon units represented by the formula (VII) below, may also be introduced as chain terminators,

(VII)

wherein, R represents a straight-chain or branched alkyl group containing 10 to 30 carbon atoms that may be substituted with a halogen. Examples of the aliphatic monocarboxy compounds are alkyl monocarboxylic acids such as undecanoic acid, lauric acid, tridecanoic acid, pentadecanoic acid, palmitic acid, heptadecanoic acid, stearic acid, nonadecanoic acid, heneicosanoic acid, tricosanoic acid, melissic acid, and the like; methyl stearates, ethyl stearates, phenyl stearates, methyl esters, ethyl esters, and phenyl esters of alkyl monocarboxylic acids, and the like; as well as combinations comprising at least one of the foregoing aliphatic monocarboxylic compounds. As used herein the term "aliphatic" refers to a radical having a valence of at least one comprising a linear or branched array of atoms that is not cyclic. The array may include heteroatoms such as nitrogen, sulfur and oxygen or may be composed exclusively of carbon and hydrogen. The array may include a phenyl substituent. Examples of aliphatic radicals include methyl, methylene, ethyl, ethylene, hexyl, hexamethylene and the like.

These types of aliphatic monocarboxy compounds may be used in amounts of about 0.01 to about 0.20 moles per mole of the aromatic dihydroxy compound. Within this range, it is generally desirable to have an amount greater than or equal to about 0.02 moles per mole of the aromatic dihydroxy compound. Also desirable within this range is an amount less than or equal to about 0.15 moles, more preferably less than or equal to about 0.10 moles per mole of the aromatic dihydroxy compound. Use of the above types of chain termination agents in total amounts greater than about 0.2 moles per mole of the aromatic dihydroxy compound may reduce the rate of polymerization.

A catalyst quenching agent may be added to the polycarbonate composition downstream of the first reaction container. The use of acidic "quenchers" or catalyst scavengers minimizes the effect of the residual catalyst on the final product. Such reduction is referred to as "quenching". Quenching of residual alkaline catalyst may be accomplished using an acidic compound selected from the group consisting of a Brownsted acid, Lewis acid and derivatives of an acid containing a sulfur atom. Exemplary acids containing a sulfur atom are alkyl phenyl sulphonic acids. Exemplary derivatives includes esters such n-butyl tosylate, Quenching of residual alkaline catalyst may be accomplished using, for example, n-butyl tosylate in a powder carrier or in a non-powder carrier such as liquid or solid pellets containing quencher or coated with the quencher. The catalyst quenching agent may be employed in amounts of about 0.05 ppm to about 100 ppm based on the total weight of the polycarbonate. Within this range it is preferable for the catalyst quenching agent to be used in an amount less than or equal to about 50 ppm, more preferably less than or equal to about 10 ppm. Also within this range it is preferable for the catalyst quenching agent to be used in an amount greater than or equal to about 0.1 ppm, more preferably greater than or equal to about 0.5 ppm.

The dihydroxy compound(s) and the carbonic acid diester(s) are combined with the catalyst(s) at atmospheric pressure at a temperature of about 80° C. to 200° C. Within this range it is generally desirable to use a temperature of greater than or equal to about 100° C., preferably greater than or equal to about 120° C. Also desirable within this range is a temperature of less than or equal to about 200° C., and preferably less than or equal to about 190° C. It is generally desirable to maintain the reactants in the above mentioned temperature range for a time sufficient to mix the components of the reaction and bring the components to a common temperature, typically up to about 8 hours, preferably for up to about 6 hours, and even more preferably for up to about 4 hours. While this is primarily a mixing step some reaction between the components may occur. The temperature of the mixture is then raised, while the pressure in the reactor is lowered, thus facilitating a reaction between the dihydroxy compound and the carbonic acid diester. The dihydroxy compound and the carbonic acid diester are reacted at temperatures of about 210° C. to about 290° C., under reduced pressures of less than or equal to about 200 mm Hg, preferably less than or equal to about 150 mm Hg to produce an oligomer containing mixture. The oligomer containing mixture is then reacted at a temperature of about 270° C. to about 315° C. and a pressure less than or equal to about 7.5 mm Hg, preferably less than or equal to about 3.75 mm Hg to produce a polycarbonate containing mixture. Catalyst quenching agent is added to the polycarbonate containing mixture, preferably prior to devolatization. Devolatizaton typically occurs in a vented extruder although in a one embodiment devolatization comprises exposing the polycarbonate containing mixture to a temperature of about 270° C. to about 315° C. and a pressure of about 0.075 to about 2.25 mm Hg prior to extrusion. The extruder is preferably operated at a temperature of about 250° C. to about 380° C. and the vent pressure of the vented section(s) is preferably about 1 mmHg to about 760 mmHg. During extrusion additives may be added to the polycarbonate.

The polycarbonate may contain various additives as dictated by its intended use. Thus, at least one additive of the types including a heat stabilizer, epoxy compounds, an ultraviolet absorbent, a mold release agent, a colorant, an antistatic agent, a flame retardant, a lubricant, an anti-fogging agent, a natural oil, a synthetic oil, a wax, an organic filler and an inorganic filler, which are generally used in the art may be incorporated in the polycarbonate obtained. Examples of additives include (a) phosphorous acid, (b) sulfur-containing acidic compounds with a pKa value of no more than 3, and derivatives thereof, (c) alcohol compounds containing ester groups, (d) phosphorous esters, and other additives (e) according to the intended use, examples of which include thermal stabilizers, epoxy compounds, UV absorbents, release agents, colorants, antistatic agents, slip agents, anti-blocking agents, lubricants, anti-clouding agents, natural oils, synthetic oils, waxes, organic fillers, and inorganic fillers. These additives (a) to (e) are preferably added and kneaded while the polycarbonate is still in a molten state.

Many different types reactors may be used for the production of polycarbonate. Either continuous or semi-continuous reactors may be used. Continuous reactors are generally preferred. It is generally desirable to use a reactor having multiple modes of agitation, so that when the viscosity of the reaction mixture is low during the pre-polymerization stage, one mode of agitation is utilized, while another mode of agitation is used during polymerization and post-polymerization when the viscosity of the reaction mixture is high. Examples of reactors that may be utilized in the production of polycarbonate include polymerization tank(s) (e.g., a vertical agitation, thin film, vacuum room, flat agitation, and the like), biaxial vent extruder, and the like, as well as combinations comprising at least one of the foregoing reactors. It is generally desirable to use a reactor system having at least two reactors in series, with at least one of the reactors being a vertical agitation polymerization tank.

As used herein, the term "oligomeric polycarbonate" and "polycarbonate oligomer" have the same meaning and refer to a polycarbonate comprising 2 to about 12 monomer units.

The production of polycarbonate using a dihydroxy aromatic compound and a carbonic diester through melt polymerization involving the use of a catalyst scavenger or quenching agent, and subsequent devolatilization of un-reacted organic compounds under vacuum conditions are described. The devolatilization of un-reacted organic compounds reduces contamination of the polycarbonate product by un-reacted aromatic compounds, a contamination which can otherwise lead to the evolution of gases when the polycarbonate is used under temperatures well above room temperature. The presence of such un-reacted molecules can also be detrimental to the taste and other organoleptic properties of liquids and solids contained in vessels such as water bottles, milk bottles, glasses, nursing bottles, food containers, and the like.

It was discovered that the introduction of a catalyst quenching agent at a point in the process upstream of the last reactor or any other properly agitated similar equipment (provided that sufficient residence time and vacuum is applied to the polymer) can help further decrease the level of organic residuals in the polymer. It was found that the quencher concentration and addition point, the addition of hydroxy containing compound, the extrusion temperature and vent pressure alter the content of un-reacted organic molecules present in the final product.

A polycarbonate can be prepared in a broad range of molecular weights (measured as weight average molecular weight versus polystyrene standards with a Waters GPC, methylene chloride licrosolve as carrier liquid, a UV diode array spectrophotometer as detector). Typically, polycarbonates produced may have molecular weights of about 10,000 to about 90,000 dalton, preferably about 25,000 to about 70,000 dalton. Typically, the polycarbonate obtained has viscosity values measured as MVR (Melt Volume Rate measured at 300° C. using a force of about 1.2 kg, and expressed in $cm^3/10$ minutes) of about 1 to about 100, and preferably about 3.5 to about 60. The amount of hydroxy groups present in the polycarbonate produced is typically about 50 ppm to about 10,000 ppm, and preferably about 200 ppm to about 2,000 ppm based on the total weight of the polycarbonate. The amount of side chain branching measured as branching points (Fries compound) via methanolysis and subsequent HPLC using an isocratic water-acetonitrile liquid phase and an UV diode array spectrophotometer as detector, ranges between about 0 and about 5,000 ppm, and preferably between about 0 and about 3,000 ppm based on the total weight of the polycarbonate. The ion content of the polycarbonate may be measured by ion chromatography with a Dionex DX500 Ion Chromatograph. The sample is submerged in de-ionized water kept at 55° C. for 24 hours and the anions released into the water are then analyzed. Residual organic compounds are measured by a solution-extraction-precipitation followed by HPLC.

The described polycarbonate may be used in a variety of products such as an optical disc substrate, an electronic device such as an integrated circuit, and a container for food. Because of its relatively low anion content, the polycarbonate produced by the disclosed method is particularly suitable as a material for electronic devices, including integrated circuits. Because of its low residual, leachable aromatic compound content, a polycarbonate produced by the disclosed method is also particularly suitable as a material for containers for food or for pharmaceutical compounds.

As described above, and as further shown in the examples below, the disclosure provides a non-phosgene route for preparing a polycarbonate having good transparency and color; that is either substantially free of residual ions, or characterized by a substantially reduced amount of residual ions; that is substantially free of un-reacted, residual aromatic compounds; and which is substantially free of undesirable branching or rearrangement products.

The invention is further illustrated by the following non-limiting examples.

EXAMPLES

Examples 1 to 9

An equimolar amount of molten bisphenol A (BPA) and diphenyl carbonate (DPC) were supplied directly to a formulation tank via pipe from bisphenol A production equipment, and diphenyl carbonate distillation respectively. $5.3 \times 10^{-5}$ mols of tetramethylamonium hydroxide (TMAH) per mol of bisphenol A, and $5 \times 10^{-7}$ mols of sodium hydroxide (NaOH) per mol of bisphenol A were also continuously supplied to the stirred formulation tank maintained at 157° C. The mixture from the formulation tank was continuously provided to prepolymerization tank I, together with some extra molten diphenyl carbonate supplied directly to prepolymerization tank I via pipe following distillation, and subsequently to prepolymerization tank II, polymerization tank I, polymerization tank II. Typical values of metal content in raw materials are the following: iron (50 ppb); titanium (10 ppb); chromium (20 ppb); cupper (15 ppb) based on the total weight of diphenyl carbonate; and iron (50 ppb) based on the total weight of bisphenol.

The temperatures in the prepolymerization tanks I and II were respectively 240° C. and 280° C. The pressures in the prepolymerization tanks I and II were respectively around 131 mm Hg and 16 mm Hg. The temperatures in the Polymerization tanks are specified in Table 1. The pressures in the Polymerization tanks I and II were between 0.75 to 2.25 mm Hg. The molar ratio (shown in Table I) was defined as the total molar diphenyl carbonate (DPC) feed rate divided by the bisphenol A molar feed rate.

The polycondensation reaction melt product was passed from the reactor through the extruder and thereby pelletized, during which time n-butyl tosylate was added as a quencher to the extruder to produce polycarbonate. The amount of n-butyl tosylate is shown in Table 1 in ppm based on the total weight of the polycarbonate. This addition was performed as a polycarbonate powder dry blend comprising polycarbonate powder to which a small amount of liquid quencher had been previously added, together with 100 ppm deionized water based on the total weight of the polycarbonate. The pellets were evaluated for melt volume rate (MVR) and phenol, bisphenol A, and diphenyl carbonate content. MVR was determined at 300° C. with a force of 1.2 kg. MVR values are expressed in cm$^3$/10 minutes. Phenol, bisphenol A and diphenyl carbonate content was determined by high pressure liquid chromatography (HPLC). Phenol, bisphenol A and diphenyl carbonate values are expressed in parts per million by weight (ppm) based on total weight of polycarbonate. Table 1 shows the operating conditions and the results of Examples 1 to 9.

When the temperature of the polymerization tanks I and II was increased (experiments 1 to 8), the MVR decreased (increase of polymer viscosity). As a result of the temperature increase, the amount of phenol and diphenyl carbonate present in the polymer decreased, while the content of un-reacted bisphenol A was roughly constant. Comparing experiments 1 and 9 in which the temperature of the polymerization tanks was increased 20° C., and the same MVR was obtained, a decrease of the residual phenol, and an increase of the un-reacted diphenyl carbonate was observed, with minor change on the bisphenol A content.

The ion levels of the material produced in Examples 1–9 was measured by the leaching method previously described and found to be undetectable (less than 5 ppb of chloride, sulfate and phosphate). The metal content of the polycarbonate was substantially the same as the combined metal content of the raw materials.

Examples 10 to 15

An equimolar amount of molten bisphenol A and diphenyl carbonate were supplied directly to a formulation tank via pipe from bisphenol A production equipment and diphenyl carbonate distillation respectively. $5.35 \times 10^{-5}$ mols of tetramethylamonium hydroxide (TMAH) per mol of bisphenol A, and $5 \times 10^{-7}$ mols of sodium hydroxide (NaOH) per mol of bisphenol A were continuously supplied to the formulation tank maintained at 157° C. The mixture from the formulation tank was continuously provided to prepolymerization tank I, together with some extra molten diphenyl carbonate supplied directly via pipe following distillation, and subsequently to prepolymerization tank II and polymerization tank I. Typical values of metal content in the reactants are the following: iron (50 ppb); titanium (10 ppb); chromium (20 ppb); copper (15 ppb) based on the total weight of diphenyl carbonate; and iron (50 ppb) based on the total weight of bisphenol.

Polymerization was conducted under aforementioned reaction conditions to produce different polycarbonate samples, with the exception of the lower pressure in the Polymerization tank II, between 0.30 to 1.0 mm Hg. The molar ratio was defined as the total molar DPC feed rate divided by the bisphenol A molar feed.

A liquid stream containing a low boiling organic solvent, DPC and n-butyl tosylate was injected into the polymer melt downstream of the polymerization tank I. After injection, the polymer was pumped through a devolatilizer tank equipped with a condenser with cooled water at 5° C. and connected to a high vacuum line, at a pressure lower than 1.0 mm Hg.

TABLE 1

| | | Operating Conditions | | | | Average | | |
|---|---|---|---|---|---|---|---|---|
| Experiment | MVR @ 300° C. | Pol Tank I T (° C.) | Pol Tank II T (° C.) | Mol ratio of DPC to BPA | Ppm Butyl Tosylate | ppm Phenol | ppm BPA | ppm DPC |
| 1 | 26.5 | 280 | 280 | 1.06 | 3 | 101 | 23 | 337 |
| 2 | 21.5 | 285 | 285 | 1.05 | 4 | 92 | 25 | 282 |
| 3 | 12 | 293 | 293 | 1.05 | 3 | 89 | 26 | 185 |
| 4 | 9.5 | 295 | 295 | 1.05 | 3 | 82 | 29 | 179 |
| 5 | 6.5 | 298 | 298 | 1.04 | 3 | 72 | 23 | 168 |
| 6 | 6 | 299 | 299 | 1.04 | 3 | 66 | 30 | 111 |
| 7 | 4.5 | 304 | 304 | 1.04 | 3 | 66 | 28 | 98 |
| 8 | 4.4 | 305 | 305 | 1.04 | 3 | 65 | 30 | 88 |
| 9 | 26.5 | 300 | 300 | 1.07 | 2 | 67 | 30 | 394 |

The concentration of butyl tosylate in the polymer melt was varied by changing the liquid stream flow rate.

The polycondensation reaction melt product was passed from the devolatilizing tank through the extruder and thereby pelletized. The pellets were evaluated for MVR as well as phenol, bisphenol A and diphenyl carbonate content as in Examples 1–9. Examples 10 and 11 were evaluated for melt flow rate (MFR) at 250° C. instead of MVR. MFR values are in grams/10 minutes. Table 2 shows the operating conditions and the results of examples 10 to 15.

TABLE 2

| | | Operating Conditions | | | | Average | | |
|---|---|---|---|---|---|---|---|---|
| Experiment | MVR @ 300° C. | Pol Tank I T (° C.) | Pol Tank II T (° C.) | Mol ratio of DPC to BPA | Ppm Butyl Tosylate | ppm Phenol | ppm BPA | ppm DPC |
| 10 | 12* | 280 | 280 | 1.08 | 10 | 17 | 18 | 172 |
| 11 | 14* | 300 | 300 | 1.10 | 10 | 13 | 6 | 166 |
| 12 | 21.5 | 295 | 295 | 1.04 | 10 | 30 | 51 | 86 |
| 13 | 21.5 | 295 | 295 | 1.04 | 5 | 36 | 56 | 66 |
| 14 | 20 | 295 | 295 | 1.04 | 10 | 23 | 47 | 83 |
| 15 | 20 | 295 | 295 | 1.04 | 5 | 29 | 50 | 70 |

Employing the disclosed process for preparing a polycarbonate provides a number of advantages. The disclosed process enables production of a polycarbonate having good transparency and color that is characterized by a substantially reduced concentration of residual ions, by a substantially reduced concentration of un-reacted aromatic compounds, and which is substantially free of undesirable branching or rearrangement products.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A polycarbonate composition comprising chloride, sulfate, phosphate or a combination of two or more of the foregoing ionic species, wherein the chloride, sulfate, phosphate, or combination of ionic species is present in an amount of zero to about 100 parts per billion based on the total weight of the polycarbonate; and phenol, carbonic diester, aromatic dihydroxy compound or combination of two or more of the foregoing organic compounds, wherein the phenol, carbonic diester, aromatic dihydroxy compound, or combination of the foregoing organic compounds is present in an amount of zero to about 500 parts per million by weight based on the total weight of the polycarbonate; wherein the polycarbonate has a weight average molecular weight of about 40,000 to about 90,000 dalton as determined by gel permeation chromatography using polystyrene standards and a melt volume rate of about 1 to about 35 cubic centimeters 10 mutes when measured at about 300° C. with a force of about 1.2 kilograms.

2. The composition of claim 1 wherein the polycarbonate comprises recurring structural units the formula (I);

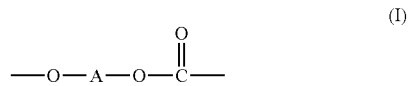

wherein A is a divalent aromatic radical of bisphenol A.

3. The composition of claim 1 wherein about 1 to about 95% of the polycarbonate molecular terminals are terminated with an aryloxy terminal group represented by the formula (VI)

ArO—           (V)

wherein Ar represents an aromatic hydrocarbon group containing 6 to 50 carbon atoms.

4. The composition of claim 1 wherein about 1 to 95% of the polycarbonate molecular terminals are terminated with an aliphatic monocarbonoxy terminal group represented by the formula (VII)

wherein R represents a straight chain or branched alkyl group containing 10 to 30 carbon atoms.

5. The composition of claim 1, wherein the polycarbonate has an amount of branching points less than 5,000 parts per million by weight based on the total weight of polycarbonate.

6. The composition of claim 1, wherein the polycarbonate has an amount of hydroxy groups of about 50 to about 10,000 parts per million by weight based on the total weight of the polycarbonate.

7. The composition of claim 1, wherein the amount of chloride, sulfate, phosphate or a combination of two or more on the foregoing ionic species is zero to about 50 parts per billion by weight based on the weight of the polycarbonate.

8. The composition of claim 1, wherein the amount of phenol, carbonic acid diester, dihydroxy aromatic compound or combination of two or more of the foregoing organic compounds is zero to about 350 parts per million by weight based on the total weight of the polycarbonate.

9. A method of making a polycarbonate composition comprising reacting a carbonic acid diester and an aromatic dihydroxy compound in the presence of a catalyst at a first temperature of about 210° C. to about 290° C. and a first pressure of about 10 to about 200 mm Hg to form an oligomer containing mixture; reacting the oligomer containing mixture at a second temperature of about 270° C. to about 315° C. and a second pressure of about 0.075 to about 7.5 mm Hg to form a polycarbonate containing mixture; adding catalyst quenching agent to the polycarbonate containing mixture and devolatizing the polycarbonate mixture under vacuum conditions wherein the aromatic dihydroxy compound comprises up to about 200 parts per billion of ions based on the total weight of the aromatic dihydroxy compound.

10. The method according to claim 9, wherein the carbonic acid diester comprises a diester selected from the group consisting of diphenyl carbonate, bis(methyl salicyl) carbonate, ditolyl carbonate, bis(chlorophenyl)carbonate, m-cresyl carbonate, dinaphthy carbonate, bis(diphenyl)carbonate, diethyl carbonate, dibutyl carbonate, dicyclohexyl carbonate, and a combination of at least two different carbonic acid diesters.

11. The method according to claim 9, wherein the aromatic dihydroxy compound comprises a bisphenol selected from the group consisting of bisphenol A, resorcinol, substituted resorcinol compounds, hydroquinone, substituted hydroquinones, as well as combinations comprising at least one of two or more of the foregoing bisphenol compounds.

12. The method according to claim 9 further comprising mixing the carbonic acid diester, catalyst and aromatic dihydroxy compound at a temperature of about 80° C. to about 200° C. and atmospheric pressure.

13. The method according to claim 9, wherein the aromatic dihydroxy compound comprises up to about 100 parts per billion by weight metal based on the total weight of the aromatic dihydroxy compound.

14. The method of claim 9 wherein the metal is selected from the group consisting of iron, nickel, chromium, titanium, manganese, and combinations of the foregoing.

15. The method according to claim 9, wherein the ions are selected from the group consisting of sulfate, chloride, phosphate and combinations of the foregoing.

16. The method according to claim 9, wherein the carbonic acid diester comprises up to about 200 part per billion by weight metal based on the total weight of the carbonic acid diester.

17. The method of claim 16 wherein the metal is selected fro the group consisting of iron, nickel, chromium, titanium, manganese, and combinations of two or more of the foregoing.

18. The method according to claim 9, wherein the carbonic acid diester comprises up to about 200 part per billion by weight ions based on the total weight of the carbonic acid diester.

19. The method according to claim 18, wherein the ions consist essentially of sulfate, chloride, phosphate and combinations of the foregoing.

20. The method according to claim 9, wherein the catalyst comprises an alkali metal catalyst or an alkaline earth metal catalyst and a beta catalyst.

21. The method according to claim 9, wherein the catalyst comprises an alkali or alkaline earth metal compound in the amount of about $10^{-8}$ mole to about $2\times10^{-6}$ mole per one mole of the aromatic dihydroxy compound.

22. The method according to claim 9, wherein catalyst comprises a basic compound and the amount of the basic compound is about $1\times10^{-6}$ to about $1\times10^{-1}$ mole per one mole of the aromatic dihydroxy compound.

23. The method according to claim 9, wherein catalyst quenching agent is a derivative of an acid containing a sulfur atom.

24. The method according to claim 9, wherein the catalyst quenching agent is employed in an amount of about 0.05 to about 100 parts per million by weight based on the total weight of the polycarbonate.

25. The method according to claim 9, wherein devolatizing occurs in a vented extruder.

26. The method according to claim 9, wherein reacting the oligomer containing mixture occurs in two sequential reactors and the catalyst quenching agent is added to the mixture prior to the last reactor.

* * * * *